United States Patent
Biswal et al.

(10) Patent No.: US 10,142,171 B2
(45) Date of Patent: Nov. 27, 2018

(54) SELECTIVE CONFIGURATION OF PACKET ENGINE FOR CABLE SERVICE FLOWS

(71) Applicant: Gainspeed, Inc., Sunnyvale, CA (US)

(72) Inventors: Iswar Biswal, Campbell, CA (US); Bhupesh Kothari, San Jose, CA (US); Alok Khambatkone, San Jose, CA (US); Philip Winterbottom, San Jose, CA (US)

(73) Assignee: NOKIA OF AMERICA CORPORATION, Murry Hill, NJ (US)

( * ) Notice: Subject to any disclaimer, the term of this patent is extended or adjusted under 35 U.S.C. 154(b) by 73 days.

(21) Appl. No.: 15/005,261

(22) Filed: Jan. 25, 2016

(65) Prior Publication Data

US 2016/0294608 A1 Oct. 6, 2016

Related U.S. Application Data

(60) Provisional application No. 62/141,808, filed on Apr. 1, 2015.

(51) Int. Cl.
*H04L 12/24* (2006.01)
(52) U.S. Cl.
CPC .................... *H04L 41/08* (2013.01)
(58) Field of Classification Search
CPC ...................................................... H04L 41/08
See application file for complete search history.

(56) References Cited

U.S. PATENT DOCUMENTS 7,856,024 B1 12/2010 Karuppiah
8,005,083 B1 * 8/2011 Diep .................. H04L 12/2801
370/389

(Continued)

FOREIGN PATENT DOCUMENTS

WO PCT/US2016/025378 3/2016

OTHER PUBLICATIONS

International Search Report and Written Opinion of PCT/US2016/025378, dated Jun. 27, 2016, Gainspeed, Inc.

(Continued)

*Primary Examiner* — Peter P Chau
(74) *Attorney, Agent, or Firm* — Loza & Loza, LLP; Jessica W. Smith (57) ABSTRACT

A novel method of handling network traffic for cable service flows in a distributed cable system is presented. Such a cable systems use remote distribution nodes in the fields to handle RF communications with cable modems in a distributed fashion. A packet engine is configured to assign a logical interface to each cable service flow in the cable system. Each logical interface in the packet engine is uniquely identifiable by a compound identifier that includes the identifier of the corresponding service flow and the identifier of the remote distribution node. The packet engine is configurable to selectively provide L3 level routing or L2 level switching/bridging between different logical interfaces. In some embodiments, the controller selects between configuring the packet engine to perform L3 routing or configuring the packet engine to perform L2 bridging based on whether the packet engine support unnumbered interfaces and integrated routing and bridging (IRB). The packet engine of the cable system is configured to use unnumbered interfaces if the number of available IP addresses for use by the cable system is limited.

12 Claims, 7 Drawing Sheets

(56) References Cited

U.S. PATENT DOCUMENTS

| | | | | |
|---|---|---|---|---|
| 8,644,706 B2* | 2/2014 | Rakib | ................... | H04N 7/10 |
| | | | | 370/229 |
| 8,782,729 B2* | 7/2014 | Rakib | .............. | H04B 10/25751 |
| | | | | 725/111 |
| 8,910,230 B2* | 12/2014 | Rakib | ............... | H04N 21/6118 |
| | | | | 725/118 |
| 8,935,739 B1* | 1/2015 | Rakib | ............... | H04N 21/2221 |
| | | | | 370/229 |
| 2005/0174962 A1* | 8/2005 | Gurevich | ............. | H04W 88/06 |
| | | | | 370/328 |
| 2006/0159100 A1 | 7/2006 | Droms | | |
| 2011/0116513 A1* | 5/2011 | Gilson | ............. | H04L 29/12952 |
| | | | | 370/469 |
| 2011/0228776 A1 | 9/2011 | Duncan et al. | | |
| 2014/0101711 A1* | 4/2014 | Rakib | ............... | H04N 21/6118 |
| | | | | 725/129 |
| 2014/0150041 A1* | 5/2014 | Rakib | ................... | H04N 7/10 |
| | | | | 725/111 |
| 2014/0150047 A1 | 5/2014 | Rakib | | |
| 2014/0314094 A1 | 10/2014 | Saltsidis et al. | | |
| 2015/0067815 A1 | 3/2015 | Overcash | | |
| 2015/0350912 A1* | 12/2015 | Head | ................... | H04W 12/08 |
| | | | | 726/4 |

OTHER PUBLICATIONS

EP16774253.5 Extended EP Search Report (dated Aug. 14, 2018).
Shiomoto et al. "Use of addresses in generalized multi-protocol label switching GMPLS) networks" Draft. Internet Engineering Task Force, IETF Standard Working Draft, Internet Society (ISOC) vol. ccamp, No. 7, Chapters 3-5, pp. 5-11 Geneva, Switzerland (May 31, 2007).

* cited by examiner

SELECTIVE CONFIGURATION OF PACKET ENGINE FOR CABLE SERVICE FLOWS

CLAIM OF BENEFIT TO PRIOR APPLICATIONS

The present Application claims the benefit of U.S. Provisional Patent Application 62/141,808, filed Apr. 1, 2015. U.S. Provisional Patent Applications 62/141,808 is incorporated herein by reference.

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000BASE-LX10, 1000Base-BX10, and others. These networks and protocols are often referred to as GigE networks, which is an abbreviation of the Gigabyte speeds and Ethernet protocols used for fiber based computer network. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video—on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950's. As a result, it is far more economically attractive to find schemes enable the existing, if bandwidth limited, CATV cable system, to be further extended to meet the ever-growing demands for additional data.

SUMMARY

Some embodiments provide a novel method of mapping cable service flows to an IP network in a distributed CATV cable system, or virtualized CCAP system (VCAP). Such a cable systems use remote distribution nodes in the fields to handle RF communications with cable modems in a distributed fashion. Some embodiments use a packet engine to handle the exchange of network data to and from the cable service flows. In some embodiments, the packet engine has an array of logical interfaces, and each cable service flow is assigned one of these logical interfaces. Each logical interface is configured to receive data or data packets from its corresponding cable service flow and to provide data or data packet to its corresponding cable service flow. The packet engine in turn perform data packet exchange between the logical interfaces and the network, which includes L2 switches, L3 routers, network services (such as DHCP, firewall, NAT, etc.), access to Internet or other external networks (through a gateway/edge router), etc.

In some embodiments, the packet engine is configured to assign a logical interface to each of these cable service flows. Some embodiments associate the identifier of a remote distribution node with a cable service flow in addition to the cable service's own identifier. Consequently, each logical interface in the packet engine is uniquely identifiable by a compound identifier that includes the identifier of the corresponding service flow and the identifier of the remote distribution node. In some embodiments, each service flow is defined as a cable modem, or as the subscribing household. In some embodiments, the identifier of the cable bundle and the identifier of the service unit form a compound identifier [cable bundle identifier, service identifier] for the service unit. The compound identifier of the service unit is then further compounded with the identifier of the remote distribution node to form the compound identifier for uniquely identifying the service flow.

In some embodiments, the packet engine is configured to provide L3 level routing/switching between the different logical interfaces. In some embodiments, the packet engine is configured to provide L2 level switching/bridging between different logical interfaces. In some embodiments, the controller selects between configuring the packet engine to perform L3 routing or configuring the packet engine to perform L2 bridging based on whether the packet engine support unnumbered interfaces and integrated routing and bridging (IRB). In some embodiments, the packet engine of the cable system is configured to use unnumbered interfaces if the number of available IP addresses for use by the cable system is limited.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a novel method of mapping cable service flows to an IP network in a distributed CATV cable system, or virtualized CCAP system (VCAP). Unlike a conventional CCAP system in which the cable head end is a cable modem termination system (CMTS) device that directly provides modulated RF signals through CATV cables to the cable modems, a VCAP system uses remote distribution nodes in the fields (remote from the central office) to handle all of the RF communications with cable modems in a distributed fashion. This leaves the central cable head end to be an all-IP/all-Ethernet hub, and the packet engine of the cable system is in some embodiments located at the cable head end for handling the IP/Ethernet traffic. Such a cable system is therefore also referred to as a distributed cable management system (DCMS). In some embodiments, the remote distribution nodes distribute the functionality of the CMTS device out into the field as if the line cards of the CMTS are remotely located in the individual neighborhoods so that the CATV cables need not run all the way to the cable head end to receive the cable RF signals. Consequently, the remote distribution nodes are also referred to as Cable Modem Remote Termination System (CMRTS) devices in some embodiments.

Figure 1:
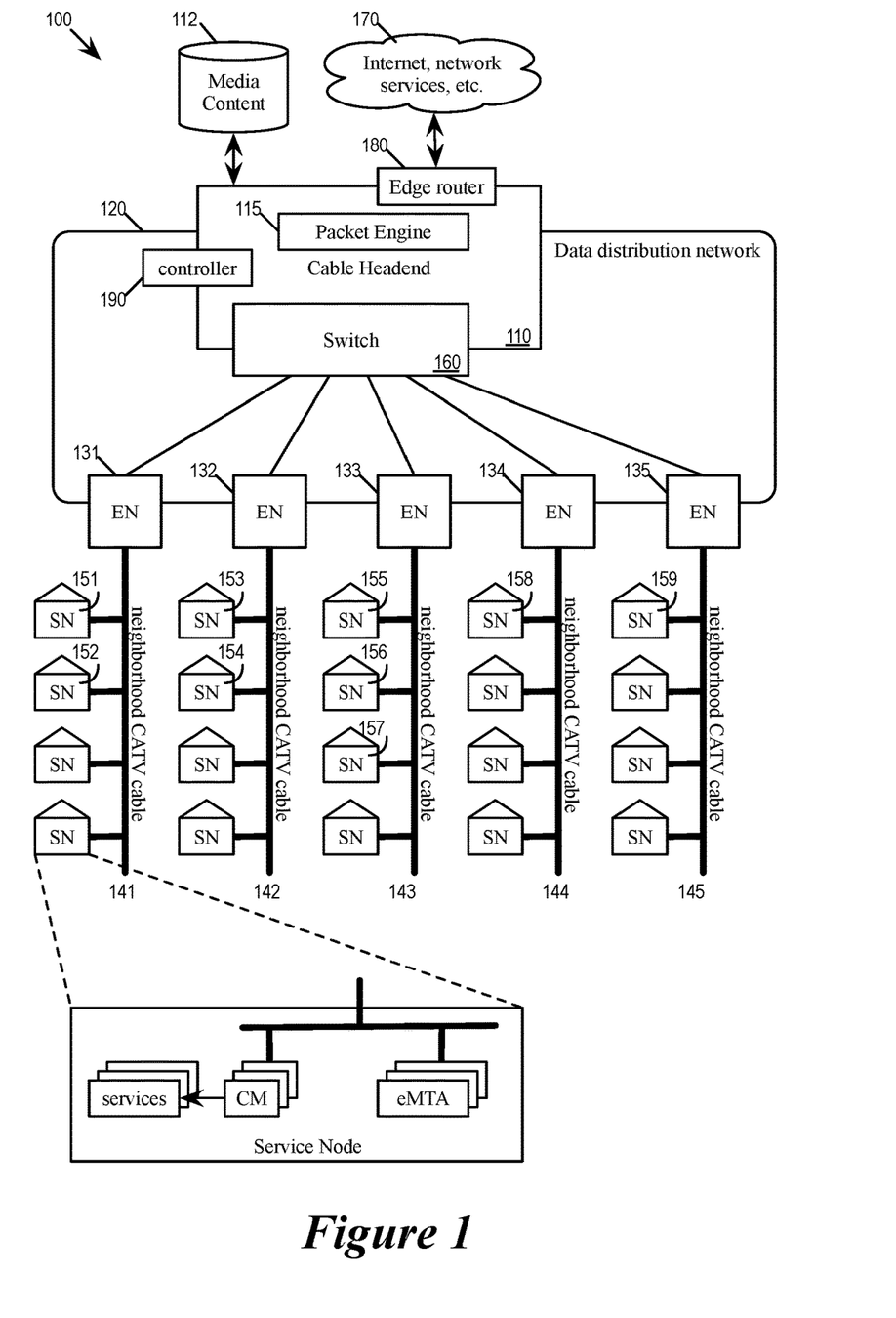
FIG. 1 illustrates a cable system that includes a packet engine for handling the IP/Ethernet traffic of the cable system.

FIG. 1 illustrates a cable system 100 that includes a packet engine 110 for handling the IP/Ethernet traffic of the cable system. The cable system and the packet engine are configured by device-specific configuration commands that are generated from normalized data models describing the cable system 100. As illustrated, the cable system 100 is a VCAP or DCMS system that has devices deployed in its head end and in the fields. Specifically, the head end includes the packet engine 115, a controller 190, an edge router 180, and a packet switch 160, while the field includes remote distribution nodes 131-135, neighborhood CATV cables 141-145, and subscriber nodes (or service nodes) 151-159. In some embodiments, the edge router 180, the packet engine 115 and the switch 160 are located within one facility (i.e., the headend of the cable system), while the remote distribution nodes 131-135 and the subscriber nodes 151-159 are in remote locations (collectively referred to as the "field" in some embodiments). In some embodiments, the switch 160, the packet engine 115, and the edge router 180 are each implemented by a set of one or more devices, and therefore can be referred to as a set of switches, a set of packet engines, and a set of edge routers, respectively.

The head end and the fields are interconnected by a distribution network 120. The remote distribution network 120 is for distributing downstream data from the cable head end 110 to the remote distribution nodes 131-135 in the fields and for receiving upstream data from the remote distribution nodes 131-135 in the fields to the cable head end 110. In some embodiments, the distribution network is a network of high capacity communication medium such optical fiber, which in some embodiments runs from the cable head end 110 to the remote distribution nodes 131-135.

The cable system 100 provides many different types of services (such as Internet access, analog television channels, digital television channels, on-demand channels, voice over IP, DOCSIS channels, etc.) to service nodes 151-159 at many different locations. The distributed architecture of this system is designed such that it can provide the service nodes with high-speed data for the desired services in a scalable, cost effect manner.

The edge router 180 connect the packet engine 115, and thereby the switches 160, the remote distribution nodes 131-135 and subscriber nodes 151-159, to the Internet 170. The edge routers handle north-south data packet traffic out of and into the DCMS 100. The packet engine 115 is responsible for routing packets to and from the devices 142 at the subscriber nodes 151-159 through the switches 160 and the remote distribution nodes 131-135. Each packet engine has limited number of input ports, which may not be able to accommodate traffic for a far greater number of remote distribution nodes for which the packet engine is responsible. Hence, the switch (or the set of switches) 160 is inserted between the packet engine 115 and the remote distribution nodes 131-135.

The switch 160 is located in the cable head end 110 or in the data distribution network 120. In some embodiments, the switch 160 serves as point-to-point connections between the remote distribution nodes and the packet engine 115. As such, the remote distribution nodes 131-135 do not communicate with each other through the switch 160 directly, but rather through L2 and L3 switching/routing facilities provided by the packet engine 115.

Each remote distribution node connects multiple subscriber nodes to the cable headend of the cable system 100. The subscriber nodes that are serviced by one remote distribution node are typically within one contiguous geographic region. In some embodiments, a service node represents a subscriber of cable services. Such a subscriber can be a household, an apartment, an office, etc. A service node is also therefore also referred to as a subscriber node in some embodiments. A service node includes one or more cable modems 142 for receiving and transmitting cable signals on its neighborhood CATV cable.

A cable modem 142 at a service node 151-153 in turn translates the received cable signals into data for subscribing devices 142 (e.g., set top box (STB), customer premise equipment (CPE), computers, handheld devices, multimedia terminal adapter (MTA), etc.) or for subscribed cable services (e.g., video on demand, voice over IP, etc.). In some embodiments, some of the subscribing devices have their own modems for directly receiving the subscribed services, such as an embedded MTA (eMTA).

In some embodiments, each remote distribution node 131-135 communicatively (1) connects to the switch 160 through one or more fiber optic cables to exchange digital data packets, and (2) connects to numerous service nodes (e.g., tens to hundreds of service nodes) through CATV cables to exchange radio frequency (RF) modulated signals. In some embodiments, each remote distribution node is an Ethernode (EN) that is associated with a MAC address, enabling a switch to direct to the EN the packets that are address to it and forward packets that are sent by the EN. This distributed architecture of system 100 is referred to as a remote MAC and PHY architecture because the in-the-field ENs that service multiple service nodes are MAC addressable, receive digital data packets, and perform the physical layer conversion to convert the digital data packets to RF signals in the field.

Each EN in some embodiments converts data packets from the cable headend into a DOCSIS compliant RF signal that are to be processed by DOCSIS compliant cable modems at the service nodes. In some embodiments, an EN strips the header information of the downstream IP packets it receives and delivers only the payload to the cable modem through the CATV cable. In other embodiments, an EN transmits the downstream IP packets in their entirety (header and payload) to the CATV cable. In some embodiments, the payloads of IP packets are digitized samples of RF waveforms, and the EN uses the digitized samples to reconstitute the RF waveform over the CATV cable. In some embodiments, the payloads of IP packets are QAM symbols, and the EN sends RF waveforms that are QAM modulated according to the received QAM symbols.

The cable system 100 also includes a controller 190. In some embodiments, the controller 190 handles the control and configuration of the cable system 100, particularly the devices and equipment at the cable head end. In some embodiments the controller 190 also controls the operation and configuration of remote distribution nodes 131-135. In some embodiments, the controller 190 is located at the head end 110 so it can control the equipment at the head end (e.g., a packet engine) directly. In some of these embodiments, the controller 190 remotely controls the remote distribution nodes through the data distribution network 120. In some embodiments, the controller is connected to the packet switch (e.g., 160) that connects to both the cable head end 110 and the remote distribution nodes 131-135.

The cable system 100 is for delivering a variety of data services through cable modems to each service nodes. These data services include cable set top box (STB), customer premise equipment (CPE), Voice over IP, multimedia terminal adapter (MTA), etc. In some embodiments, each of these data services is referred to as a cable service flow, as each of these data services requires a flow of data between the cable head end and a cable modem. It is also a unit that requests and consumes specific data (e.g., on-demand services), hence can also be referred to as a cable service-consuming unit.

Figure 2:
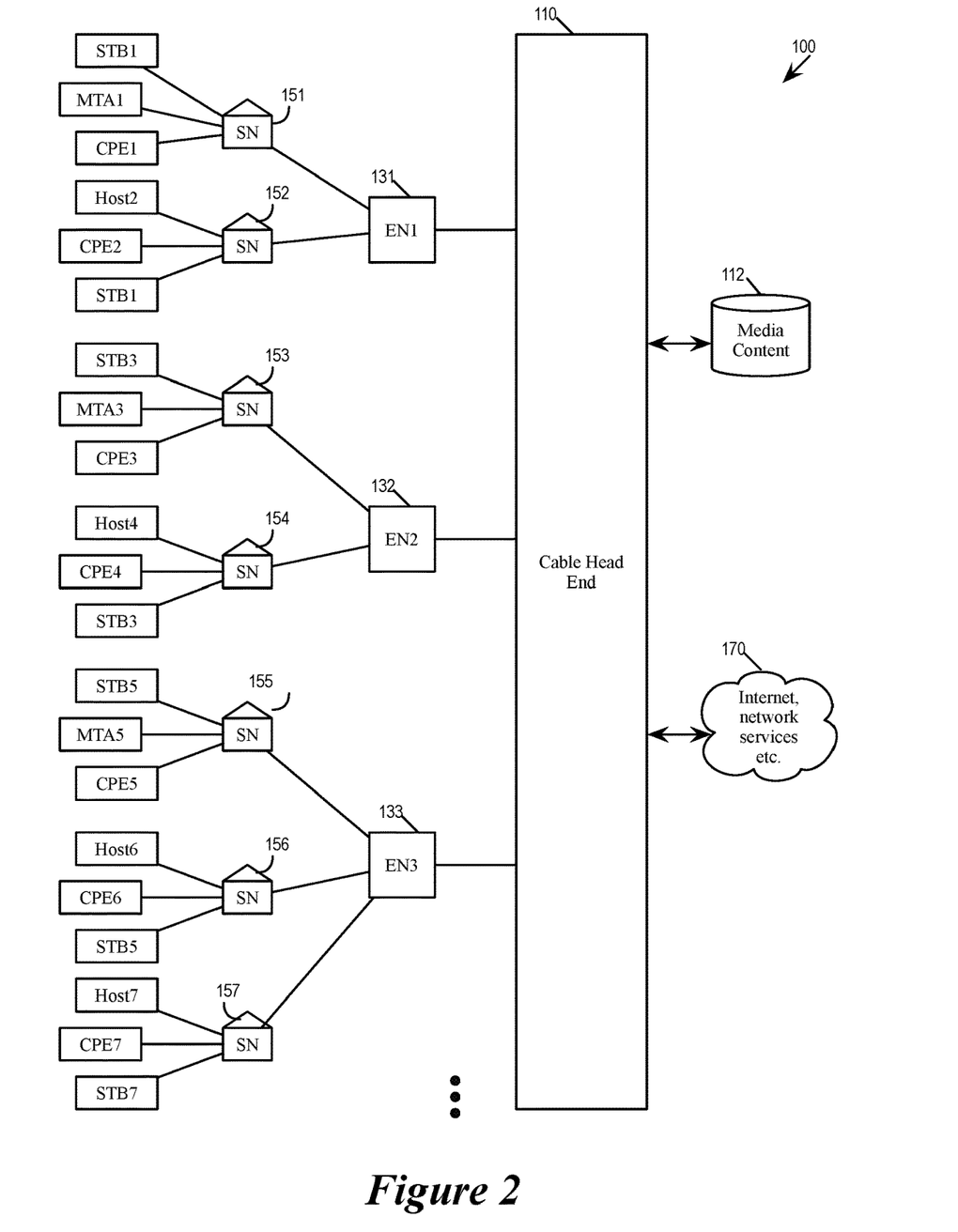
FIG. 2 illustrates cable service flows in the cable system.

For some embodiments, FIG. 2 illustrates cable service flows in the cable system 100. As illustrated, the cable system 100 includes the cable head end 110 that is connected to remote distribution nodes 131-133 (EN1-EN3) through the distribution network 120 (not illustrated). The remote distribution nodes are in turn each connected to a set of service nodes through neighborhood CATV cables. Specifically, the remote distribution node 131 (EN1) is connected to service nodes 151-152 through CATV cables 141, the remote distribution node 132 (EN2) is connected to service nodes 153-154 through CATV cables 142, and the remote distribution node 133 (EN3) is connected to service nodes 155-157 through CATV cables 143.

Each service node in turn subscribes to a set of cable service flows. In the example illustrated in FIG. 2, the service node 151 subscribes to services STB1, MTA1, and CPE1, while the service node 152 subscribes services Host2, CPE2, and STB1. As mentioned above, in some embodiments, a service node is equipped with one or more cable modems for modulating and demodulating the data for the subscribed cable service flows. In some embodiments, some service flows can simultaneously serve multiple service nodes or are provided through different cable modems. For example, the service flow STB1 simultaneously serves both the service node 151 and the service node 152.

In some embodiments, the source of the data of each of the service flows is the cable head end, which has access to resources for providing the services. As illustrated, the cable head end 110 has access to the network resources 170, which includes Internet access and network packet forwarding (L2 switch and/or L3 routing). The cable head end 110 also has access to the media content storage 112 for directly providing services such as cable TV programming without going through the Internet.

I. Addressable Service Flows in IP Network

In some embodiments, each cable service flow is regarded as a network node by the cable system 100 so it can inject data into the network as a source, and/or receive data from the network as a destination. In some embodiments, the cable head end 110 includes a packet engine for handling the exchange of network data to and from each of the cable service flows. In some embodiments, the packet engine has an array of logical interfaces, and each cable service flow is assigned one of these logical interfaces. Each logical interface is configured to receive data or data packets from its corresponding cable service flow and to provide data or data packet to its corresponding cable service flow. The packet engine in turn performs data packet exchange between the logical interfaces and the network, which includes L2 switches, L3 routers, network services (such as DHCP, firewall, NAT, etc.), access to Internet or other external networks (through a gateway/an edge router), etc. There are many devices available in the market that can serve as the packet engine for some embodiments of the invention, including MX™ series router by Juniper™ or 12000™ series router by Cisco™.

Figure 3:
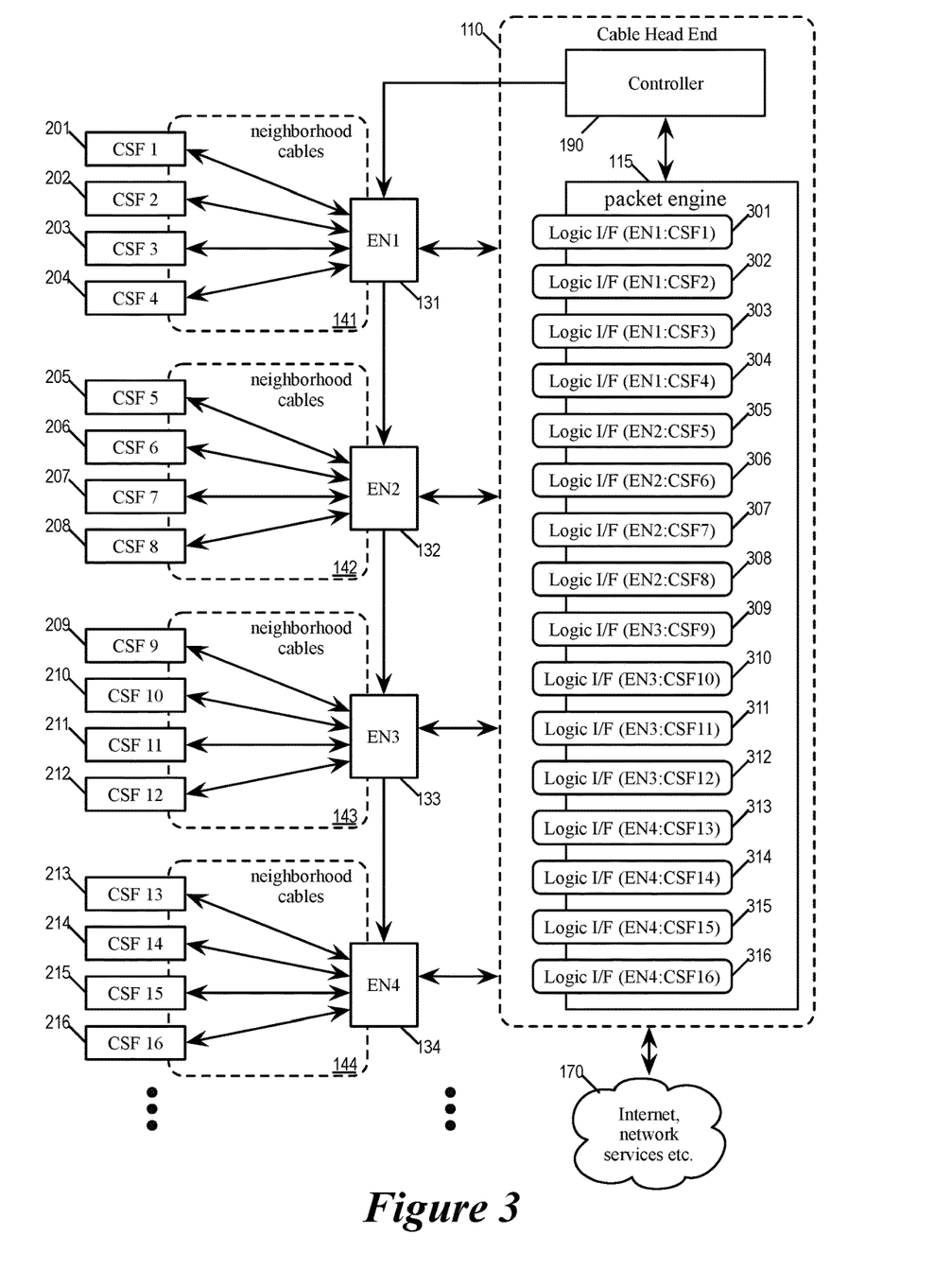
FIG. 3 illustrates a packet engine that is configured to handle packet exchange for cable service flows in a cable system.

FIG. 3 illustrates a packet engine 115 that is configured to handle packet exchange for cable service flows in the cable system 100. It is controlled and configured by the controller 190, which also controls and configures the remote distribution nodes 131-134. As illustrated, the cable head end 110 of the cable system 100 includes the packet engine 115. The cable head end 110 is in communication (e.g., through optical fiber) with the remote distribution nodes (i.e., ENs or FNs) 131-134. Each remote distribution node provides several service flows to service node users through neighborhood CATV cables and cable modems (not illustrated). Specifically, the remote distribution node 131 is providing service flows 201-204 (CSF1-CSF4), the remote distribution node 132 is providing service flows 205-208 (CSF5-CSF8), the remote distribution node 133 is providing service flows 209-212 (CSF9-CSF12), and the remote distribution node 134 is providing service flows 213-216 (CSF13-CSF16).

The packet engine 115 includes an array of logical interfaces 301-316. Each of the logical interfaces is assigned to a cable service flow in the cable system 100. Specifically, the logical interface 301-316 are assigned to cable service flows CSF1-16, respectively.

In some embodiments, identifiers of cable service flows in a cable system may not be unique, because two different cable service flows served by two different remote distribution nodes may have the same identifier. Some embodiments therefore ensure the unique identification of each cable service flow by using the identifier of its remote distribution node in addition to its own identifier. Consequently, each logical interface in the packet engine 115 is uniquely identifiable by (or associated with) a compound identifier that includes the identifier of the corresponding service flow and the identifier of the remote distribution node. For example, the logical interface 302 of the service flow 202 (CSF2) is identifiable by the compound identifier [EN1:CSF2], and the logical interface 307 of the service flow 207 (CSF7) is identifiable by the compound identifier [EN2:CSF7]. By including the identifier of the remote distribution node, the system is able to uniquely identify service flows 202 and 207, even if CSF2 and CSF7 have identifiers that are identical to each other.

Figure 4:
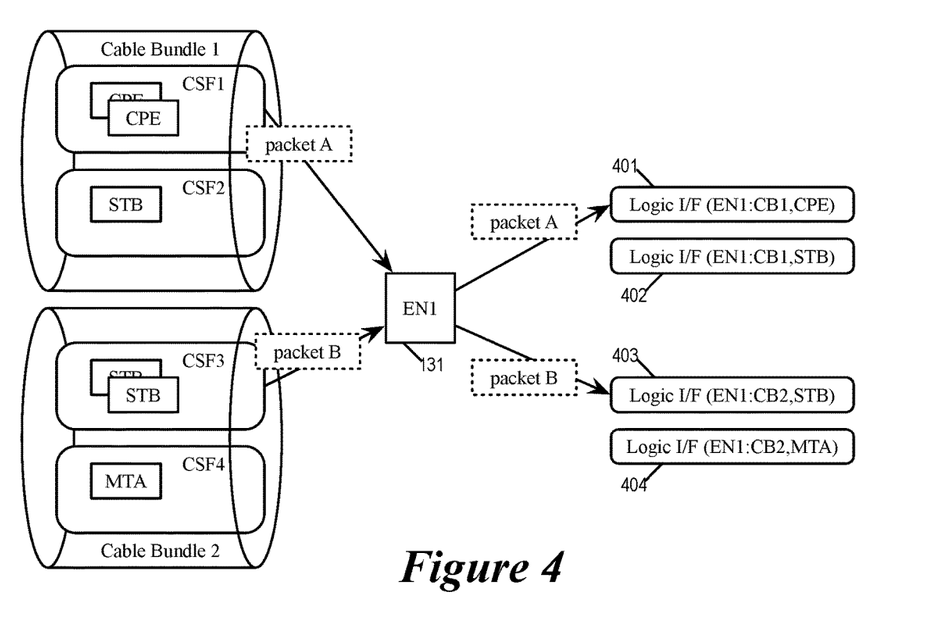
FIG. 4 illustrates cable service flows that are each a service unit under a cable bundle.
Figure 5:
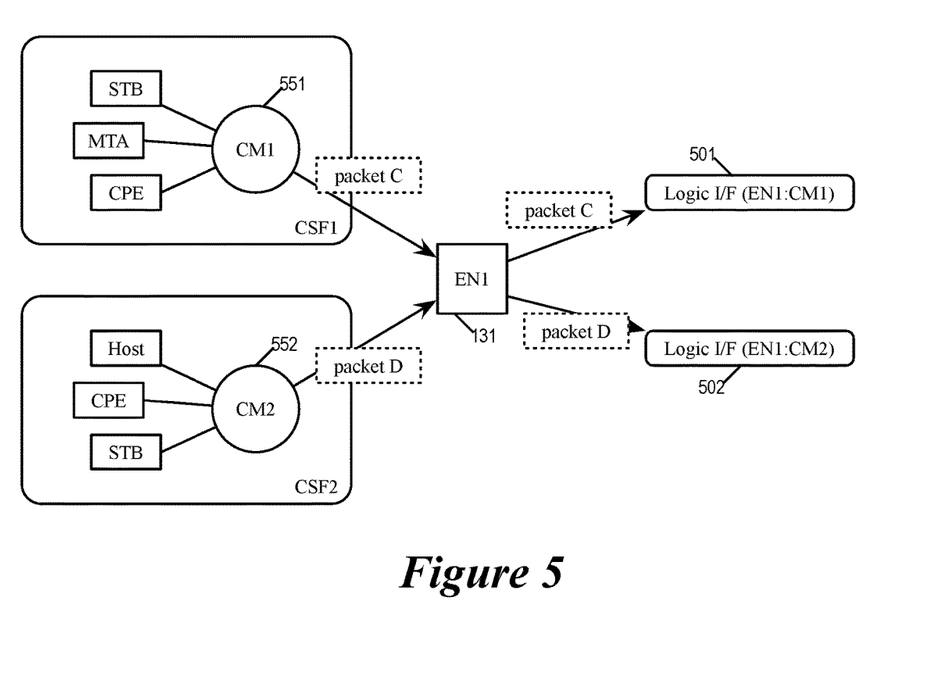
FIG. 5 illustrates cable service flows that are each defined as a cable modem.

The packet engine is configured to assign a logical interface to each of these cable service flows, and each of these logical interfaces is associated with a compound identifier for its corresponding service flow. Different embodiments define service flows differently. In some embodiments, each service flow is defined as a service unit under a cable bundle. In some embodiments, each service flow is defined as a cable modem, or as the subscribing household. Consequently, the identifiers associated with a cable service flow that are used to create a compound identifier are different in different embodiments. FIGS. 4 and 5 illustrates two different definitions of cable service flows.

FIG. 4 illustrates cable service flows that are each a service unit under a cable bundle. Cable bundles are a bundle of services as defined by DOCSIS. As illustrated, the remote distribution node 131 (EN1) serves two different cable bundles in its neighborhood, cable bundle 1 (CB1) and cable bundle 2 (CB2). The cable bundle CB1 has a service unit that corresponds to CPE services and a service unit that corresponds to STB services. Each of these two service units is defined as a service flow (CPE service of CB1 is service flow CSF1 201, STB service of CB1 is service flow CSF2 202). The cable bundle CB2 has a service unit that correspond to STB services and a service unit that correspond to MTA services. Each of these two service units of CB2 is also defined as a service flow (STB service of CB2 is service flow CSF3 203, STB service of CB2 is service flow CSF4 204).

Packets from the service flows CSF1-CSF4 goes through the remote distribution node 131 (EN1) to reach their respective logical interfaces 401-404 in the packet engine. In some embodiments, the identifier of the cable bundle and the identifier of the service unit form a compound identifier [cable bundle identifier, service identifier] for the service unit. The compound identifier of the service unit is then further compounded with the identifier of the remote distribution node to form a compound identifier for uniquely identifying the service flow. For example, the logical interface 401 is assigned to the service flow CSF1 (CPE service of cable bundle 1) and is associated with compound identifier [EN1:CB1, CPE], while the logical interface 403 is assigned to the service flow CSF3 (STB service of cable bundle 2) and is associated with compound identifier [EN1:CB2, STB].

FIG. 5 illustrates cable service flows that are each defined as a cable modem. As illustrated, the remote distribution node 131 (EN1) serves at least two cable modems in the neighborhood, 551 (CM1) and 552 (CM2). Though cable modems 551 and 552 each provides several services to its respective households or service nodes (CM1 provides STB, MTA and CPE services; CM2 provides host, CPE, and STB services), all of the services provided by one cable modem is considered a cable service flow, and that cable service flow is assigned a corresponding logical interface in the packet engine. As illustrated, all of the services provided through the cable modem CM1 are defined to be the service flow 201 (CSF1), and the all of the services provided through the cable modem CM2 are defined to be the service flow 201 (CSF2).

Packets from these service flows goes through the remote distribution node 131 (EN1) to reach their respective logical interfaces 501-502 in the packet engine. A compound identifier for a CM based service flow includes the identifiers of the remote distribution node and the cable modem. For example, the logical interface 501 is assigned to the service flow CSF1 (services of CM1) and is associated with compound identifier [EN1:CM1], while the logical interface 502 is assigned to the service flow CSF2 (services of CM2) and is associated with compound identifier [EN1:CM2].

In some embodiments, each cable service flow is defined to be a service node of a subscriber. In such instances, a cable service flow includes all of the services delivered to a subscriber through the subscriber's cable modem(s) and service specific devices in a house, apartment, office, etc.

II. Conditional Configuration of the Packet Engine

As mentioned, the packet engine maps each cable service flow to a logical interface, and then use the mapped logical interfaces as network nodes to perform packet exchange/forwarding operations for the corresponding service flows. In some embodiments, the packet engine is configured to provide L3 level routing/switching between the different logical interfaces, i.e., the packet engine performs routing table look up to translate destination L3 IP addresses into next hop L2 MAC addresses. In some embodiments, the packet engine is configured to provide L2 level switching/bridging between different logical interfaces.

In some embodiments, the controller selects between configuring the packet engine to perform L3 routing or configuring the packet engine to perform L2 bridging based on whether the packet engine support unnumbered interfaces and integrated routing and bridging (IRB). An unnumbered interface is an interface that is not assigned an IP address of its own. In some embodiments, the packet engine of the cable system is configured to use unnumbered interfaces if the number of available IP addresses for use by the cable system (and the packet engine) is limited.

Figure 6:
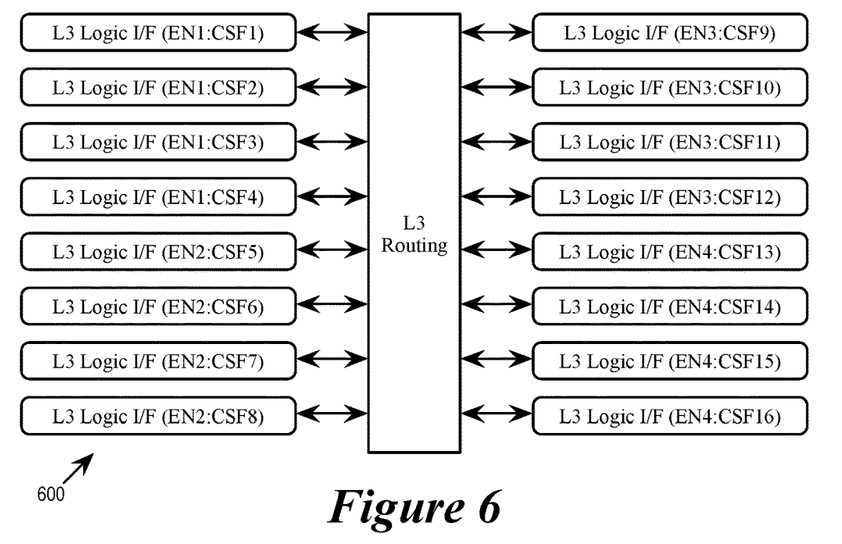
FIG. 6 conceptually illustrates a packet engine whose logical interfaces are configured to participate in L3 routing for the cable service flows.

FIG. 6 conceptually illustrates a packet engine 600 whose logical interfaces are configured to participate in L3 routing for the cable service flows. As illustrated, each of the logical interfaces can exchange data with other nodes of the network through L3 routing. In some of these embodiments, each of the logical interfaces is assigned an IP address and can directly serve as a destination of L3 routing. In other words, these logical interfaces are not unnumbered interfaces.

Figure 7:
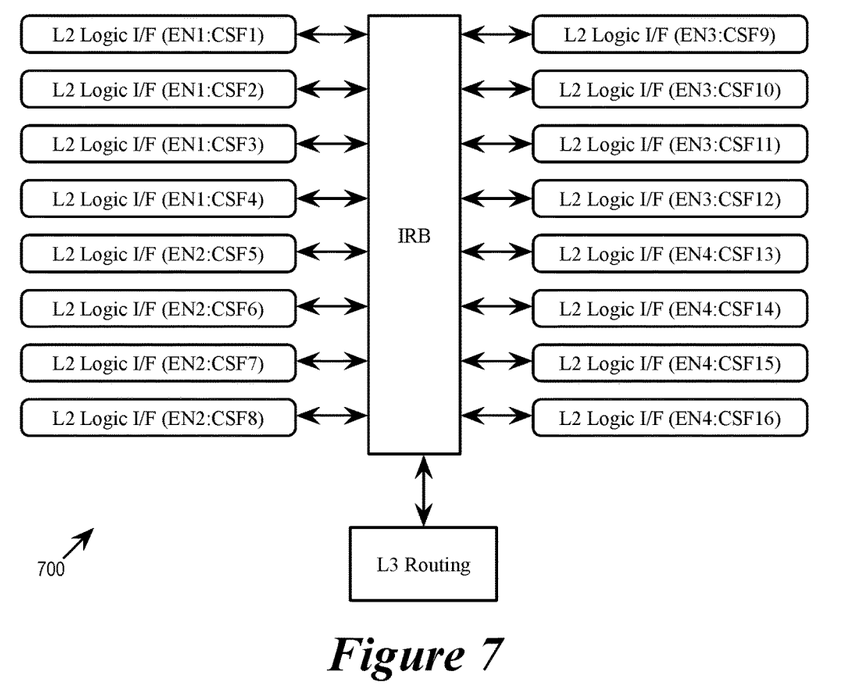
FIG. 7 conceptually illustrates a packet engine whose logical interfaces are configured to handle L2 switching and bridging for the cable service flows.

FIG. 7 conceptually illustrates a packet engine 700 whose logical interfaces are configured to handle L2 switching and bridging for the cable service flows. As illustrated, each of the logical interfaces can exchange data with other nodes of the network through integrated bridging and routing (IRB) rather than by L3 routing. In some embodiments, at least some of the logical interfaces are unnumbered interfaces that are not assigned IP addresses, and the packet exchanges rely on L2 MAC address look-ups or by L2 MAC address flooding.

Figure 8:
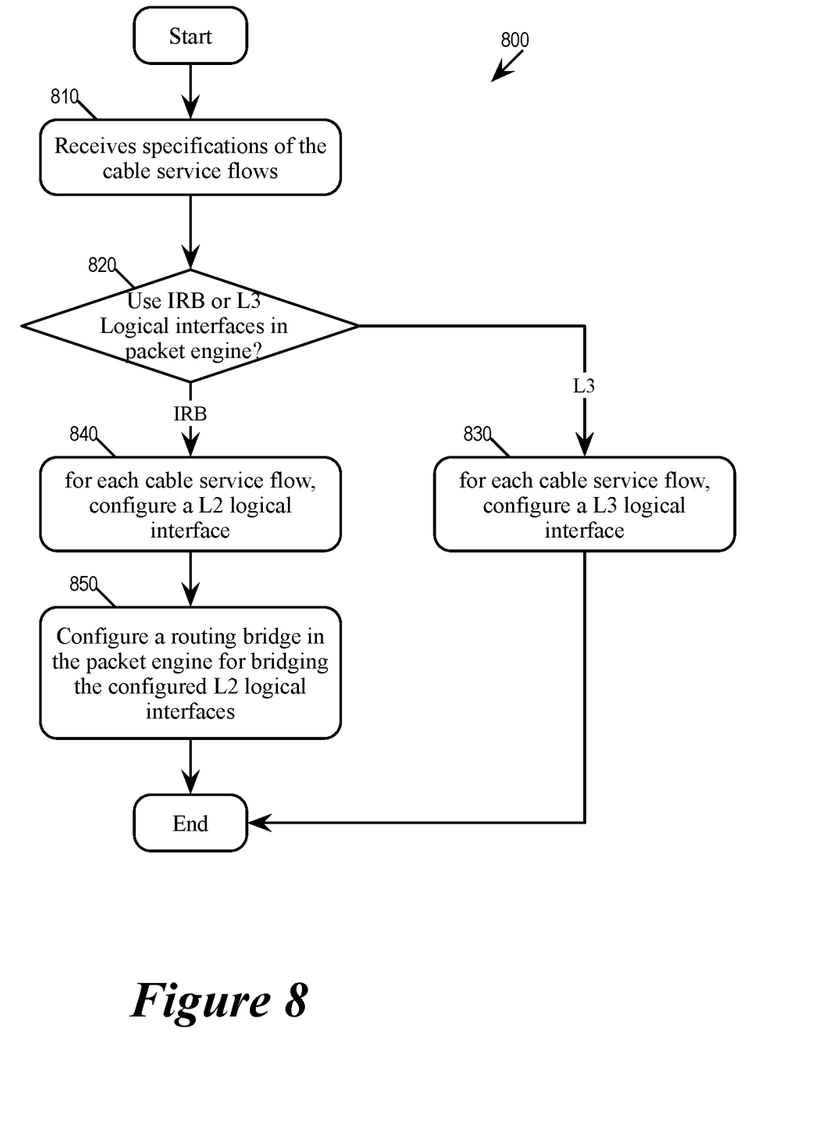
FIG. 8 conceptually illustrates a process for configuring the logical interfaces of a packet engine to perform packet exchange or packet forwarding for cable service flows.

FIG. 8 conceptually illustrates a process 800 for configuring the logical interfaces of a packet engine to perform packet exchange or packet forwarding for cable service flows. The process decides whether to configure the logical interfaces for L3 routing or for L2 integrated bridging and routing. The process is performed by a controller of a cable system (such as the controller 190) in some embodiments.

The process starts when it receives (at 810) the specifications or identifications of the service flows of the cable system. The identifiers of a service flow identify the service itself as well as the remote distribution node (EN or FN) that the service flow is connected to.

The process then determines (at 820) whether it should use L3 routing or IRB. In some embodiments, the process makes this determination based on whether unnumbered interfaces are available, whether there are enough available IP addresses to use, and/or whether integrated bridging and routing is available. In other words, in some embodiments, this decision is based on the type of packet engine that is being used. In some embodiments, the process uses L3 routing when availability of IP addresses is not an issue or when unnumbered interfaces are not available. In some embodiments, the process uses IRB when the availability of IP address is limited or insufficient and when unnumbered interfaces are supported. If L3 routing is selected, the process proceeds to 830. If IRB is selected, the process proceeds to 840.

At 830, the process configures, for each service flow, a logical interface that is capable of directly supporting L3 routing. In some embodiments, this logical interface is or will be associated with an IP address. The process 800 then ends.

At 840, the process configures, for each service flow, a logical interface that is capable of supporting L2 witching only. In some embodiments, these logical interfaces are configured as unnumbered interfaces. The process then configure (at 850) a routing bridge (IRB) in the packet engine for bridging packets between the configured L2 logical interfaces. The process 800 then ends.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
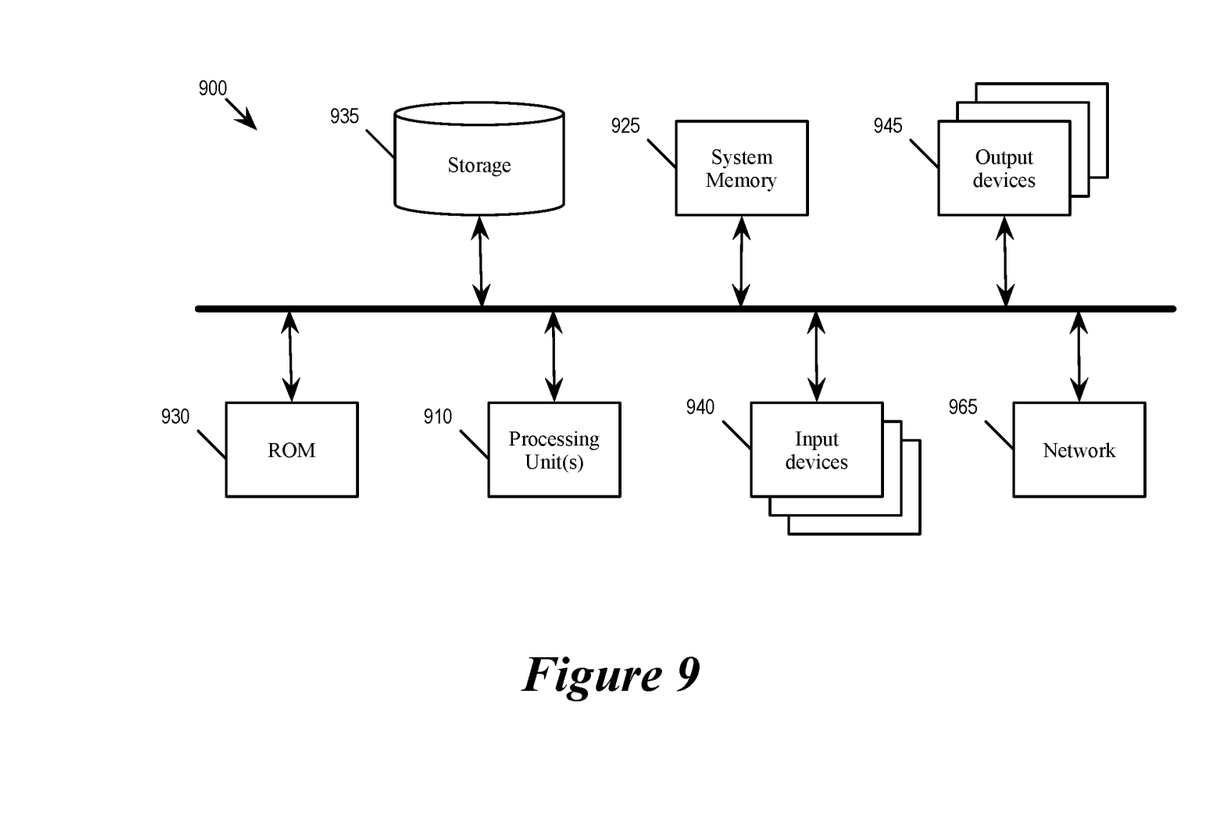
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a cable system that comprises a cable head end and a plurality of remote distribution nodes for relaying signals between the cable head end and a plurality of cable modems, the method comprising:
configuring a packet engine in the cable head end for performing packet forwarding operations for a plurality of cable service flows, the packet engine comprising a plurality of logical interfaces for handling the plurality of cable service flows, said configuring including:
assigning each of the plurality of cable service flows to a different one of the plurality of logical interfaces;
determining whether the plurality of logical interfaces support unnumbered interfaces;
configuring the plurality of logical interfaces of the packet engine in the cable head end to perform Layer 2 (L2)

switching and bridging in response to determining that the plurality of logical interfaces support unnumbered interfaces; and configuring the plurality of logical interfaces of the packet engine in the cable head end to perform Layer 3 (L3) routing in response to determining that the plurality of logical interfaces do not support unnumbered interfaces.

2. The method of claim 1, further comprising configuring a routing bridge in the packet engine to bridge packets between the configured plurality of L2 interfaces.

3. The method of claim 1, wherein each remote distribution node is a fiber node (FN) that transceives digital data over an optical fiber network with the cable head end.

4. The method of claim 1, wherein each remote distribution node is an ether node (EN) that is in Internet Protocol (IP) communication with the cable head end.

5. The method of claim 1, wherein radio frequency (RF) signals are received over RF channels that are established over cable television (CATV) cables with the plurality of cable modems.

6. The method of claim 1, wherein the packet engine is further for providing access to the Internet to the plurality of cable service flows.

7. A system comprising:
   a cable head end comprising a packet engine that comprises a plurality of logical interfaces;
   a set of cable modems for providing a plurality of cable service flows; and
   a controller for configuring said packet engine to perform packet forwarding operations for the plurality of cable service flows, wherein the controller is configured to:
   assign each of the plurality of cable service flows to a different one of the plurality of logical interfaces;
   determine whether the plurality of logical interfaces support unnumbered interfaces;
   configure the plurality of logical interfaces to perform Layer 2 (L2) switching and bridging in response to determining that the plurality of logical interfaces support unnumbered interfaces; and
   configure the plurality of logical interfaces to perform Layer 3 (L3) routing in response to determining that the plurality of logical interfaces do not support unnumbered interfaces.

8. The system of claim 7 further comprising a set of remote distribution nodes for receiving radio frequency (RF) signals from the set of cable modems and for forwarding packets to the cable head end, the packets created based on the received RF signals for the plurality of cable service flows.

9. The system of claim 8, wherein each remote distribution node is a fiber node (FN) that transceives digital data over an optical fiber network with the cable head end.

10. The system of claim 8, wherein each remote distribution node is an ether node (EN) that is in Internet Protocol (IP) communication with the cable head end.

11. The system of claim 7, wherein radio frequency (RF) signals are received over RF channels that are established over cable television (CATV) cables with the set of cable modems.

12. The system of claim 7, wherein the packet engine is further for providing access to the Internet to the plurality of cable service flows.

* * * * *